Figure 1:
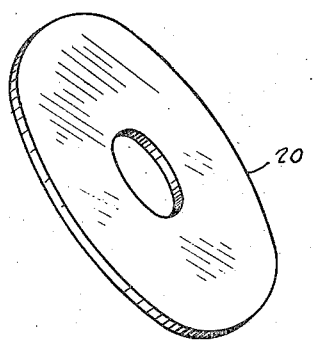

April 7, 1936.  P. J. FITZGERALD  2,036,801

METHOD OF MAKING RINGS

Original Filed June 18, 1934  3 Sheets-Sheet 1

WITNESSES:
Jackson F. Normann.
Anna M. Ward

INVENTOR:
PATRICK J. FITZGERALD
BY Joshua B. H. Hopks
ATTORNEY

April 7, 1936.   P. J. FITZGERALD   2,036,801
METHOD OF MAKING RINGS
Original Filed June 18, 1934   3 Sheets-Sheet 3
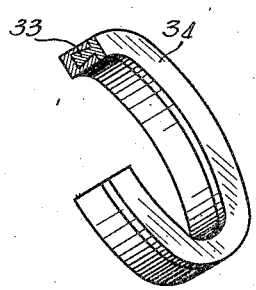
Fig. 13
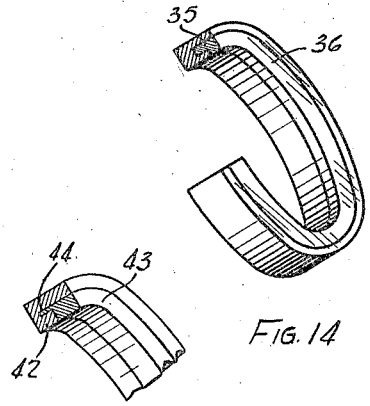
Fig. 14
Fig. 19
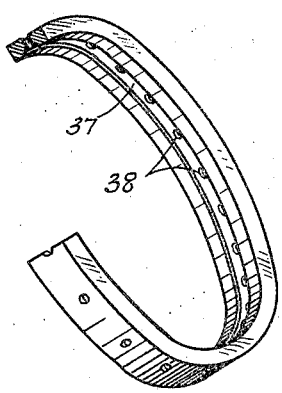
Fig. 16
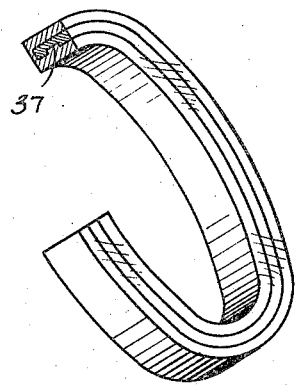
Fig. 15
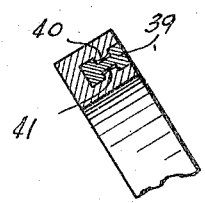
Fig. 18
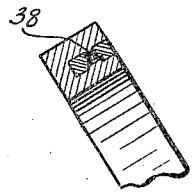
Fig. 17
WITNESSES:
INVENTOR:
PATRICK J. FITZGERALD
BY
ATTORNEY Patented Apr. 7, 1936

2,036,801

UNITED STATES PATENT OFFICE 2,036,801

METHOD OF MAKING RINGS

Patrick J. Fitzgerald, Torrington, Conn.

Original application June 18, 1934, Serial No. 731,106. Divided and this application November 27, 1934, Serial No. 754,938

6 Claims. (Cl. 29—156)

This invention relates to a method of making rings, and is a division of application Serial No. 731,106, filed June 18, 1934.

An object of the invention is to make by die pressing from sheet metal, rings which have heretofore been made by sawing sections from solid shafts and drilling and machining the sections to produce the rings. Such rings are of quite general utility, but at the present time, apparently find their greatest field as valve seats in internal combustion engines, and so far as any description of utility is concerned, they will, in the present application, be so designated without, however, any intention of limiting the invention thereby.

A further object of the invention is to provide a method of producing by die stamping from sheet metal or the like, such form that the completed ring has the appearance and utility of a solid ring, and with added features of response to temperatures utilized principally in shrinking the ring into position.

A further object of the invention is to provide a method of making a ring whereby a sheet of metal is die stamped in the shape of a washer and later by subsequent steps die pressed into the form of a ring, the radial thickness of which is substantially double the thickness of the sheet metal from which it is produced.

A further object of the invention is to provide a method of making a ring which will include folding the parts together, and during such folding, to insert therebetween an additional ring of metal or alloy having a greater coefficient of expansion than the metal from which the ring is produced.

A further object of the invention is to provide a method including steps resulting in the making of a ring having an inset extending beyond the margins of the folded ring proper, and adapted to form a valve seat or the like.

The invention, therefore, comprises a method of making a ring which consists in stamping from a sheet of metal an annulus shaped like a washer, which is then inserted into a die press and the outer perimeter contracted to form a flange, while the inner parts are expanded toward the flange formed by the outer part, and the process continued step by step until the inner and outer parts are forced into intimate union, and including during such formation the insertion between the inner and outer flanges of a ring of metal or alloy having a greater coefficient of expansion than the metal of the ring proper, which said inserted ring extends entirely to the edge, which is composed of the inner and outer flanges, and after the flanges under the pressure of the die press have been folded to retain the inserted ring, machining and grinding all to the necessary finish and shape to provide a valve seat or other utility, and also includes, as a part of the method, the insertion of the ring, the flowing of the metal of the ring proper into the recesses formed by the inserted ring or other irregularities, whereby the inserted ring is given additional anchorage, which said inserted ring may extend over and cover the adjacent edges of the inner or outer flanges, or both when completed.

Figure 2:
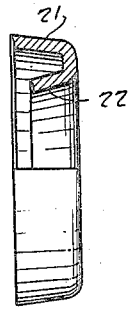
Figure 4:
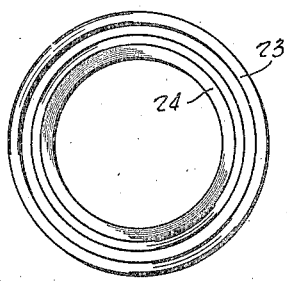
Figure 3:
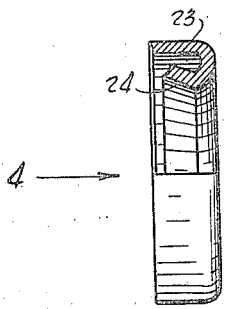

The drawings illustrate several embodiments of the invention and the views therein are as follows:

Figure 1 is a perspective view of the initial step showing an annulus or washer cut from a sheet of material, Figure 2 is a view partly in side elevation and partly in diametrical section of the first step accomplished by the use of a die press wherein the perimeter of the washer has been upset approximately to right angles to its original plane and contracted, and the inner part has been also upset and expanded, Figure 3 is a view partly in side elevation and partly in section of the next succeeding step whereby the outer flange has been pressed to substantial cylindricity and the inner part folded nearer to the outer flange, Figure 4 is a view in plan, as indicated by arrow 4 at Figure 3, but with no section removed.

Figure 6:
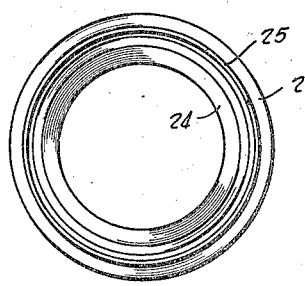
Figure 5:
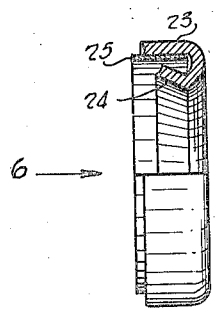
Figure 10:
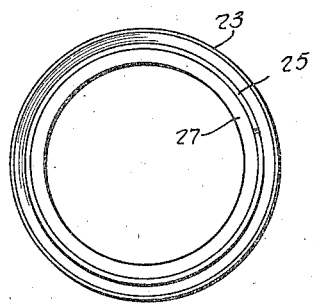
Figure 9:
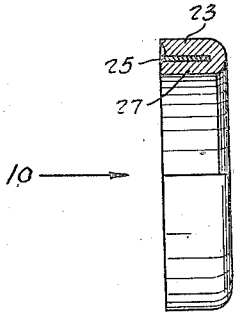
Figure 8:
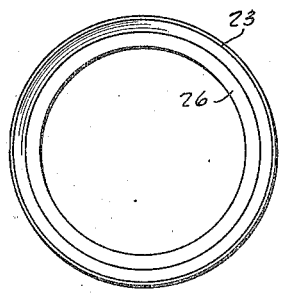
Figure 7:
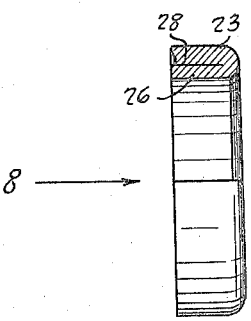
Figure 11:
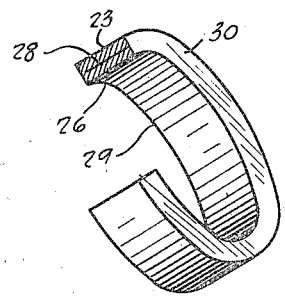
Figure 12:
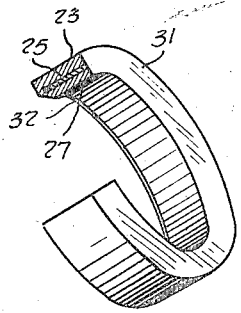

Figure 5 is a view similar to Figure 3, but with an additional ring inserted between the outer flange and the inner flange, Figure 6 is a view in elevation of the type shown at Figure 5, but with no section removed, Figure 7 is a view partly in elevation and partly in diametrical section of the completion of the pressing operation, Figure 8 is a view in elevation of the step shown at Figure 7, but with no section removed, Figure 9 is a view partly in elevation and partly in diametrical section of the completion of the pressing with the inserted ring, Figure 10 is a view in plan of the type shown at Figure 9, but with no section removed, Figure 11 is a perspective view partly in section showing the machining employed for finishing the type of ring shown at Figure 7, Figure 12 is a perspective view of the machining for finishing the type of ring shown at Figure 9 and showing a further step to produce a valve seat, Figure 13 is a perspective view partly in section showing a different type of inserted ring, Figure 14 is a perspective view partly in section, showing still another type of inserted ring, Figure 15 is a perspective view partly in section of a different type of inserted ring, Figure 16 is a perspective view partly in section of the ring which is inserted as shown at Figure 15, and Figures 17, 18 and 19 are, respectively, fragmentary views showing slight modifications of the ring shown at Figure 16 and the flowing of the metal of the principal ring into recesses formed in the inserted ring.

Like characters of reference indicate corresponding parts throughout the several views.

The ring and method of making, which forms the subject matter of this application, comprises the first step, as indicated at 20 in Figure 1, of forming an annulus or washer by stamping from a sheet of metal in substantially the usual and ordinary manner.

After such stamping, the washer is inserted into a die press and the outer perimeter is folded upwardly to form a flange 21 and the inner edge is also folded upwardly to form an inner flange 22.

The next step is to fold the outer flange to substantial cylindricity, as indicated at 23 in Figure 3, and the inner flange is folded more nearly to the edge of the outer flange and nearer to the inner wall of the flange 23, as indicated at 24 in Figures 3 and 4. At this stage a ring 25 may be inserted between the parts 23 and 24, as shown at Figures 4 and 5.

This ring 25 is intended to be of metal, having greater coefficient of expansion than the metal 20, of which the main ring is constructed, the utility of which will be hereinafter more fully explained.

Subsequent to the step shown at Figure 3, a further die pressing will maintain the position of the flange 23 but the inner flange is pressed outwardly against the flange 23, as shown at 26. When, however, the ring 25 has been inserted, the position of the inner flange will be as shown at 27 in Figures 9 and 10.

The great pressure which will be exerted by the die press will substantially flow the flanges 23 and 26 into a unitary structure, but, of course, a cleavage will be shown, as indicated at 28 in Figure 7, and when the ring 25 is inserted, the flanges 23 and 27 will substantially flow into a unitary structure with such ring 25.

After the completion of the pressing, as indicated at Figures 7 and 9, the ring will be completed to its form of usefulness by grinding at 29 and 30 to produce sides substantially smooth and substantially at right angles to the axis of the ring.

When the ring 25 is in place a similar grinding will be employed so that the side 31, which will actually show the edge of the ring 25, will be finished to such an extent that there will be no apparent cleavage between the flanges 23, 27 and the ring 25.

At Figure 12, a taper or bevel 32 is shown, which will particularly fit this ring so machined for use as a valve seat.

Instead of the ring 25, which is a plain band, in some conditions and for some purposes, a ring such as shown at Figure 13 is employed, having a transverse T-shape, the stem of which is dove-tailed, as shown at 33, and the head 34 of such proportion as to entirely cover the combined edges of the inner and outer flanges.

This may be of metal harder than the material of the ring itself, or possess other properties more particularly fitting it for its utility, whatever that may be. When used for valve seats for an internal combustion engine, it would be of metal having heat resisting qualities. For other purposes, it might possess other features of advantage.

Instead of the T-shape, as shown at Figure 13, a ring L-shaped in cross-section may be substituted, one leg of which, 35, is enclosed between the flanges of the pressed ring, while the other leg 36 is finally machined down to the plane of the outer flange.

As a different type of ring, there is shown at Figure 16 one having a groove 37 with perforations 38. When such a ring is inserted between the flanges during the die pressing operation, the metal of the ring proper will flow into the groove 37, as shown at Figure 15, and also into the perforations 38.

At Figure 17 the flowing of the metal into the perforations 38 is more particularly shown.

At Figure 18 a ring 39 is shown having an external groove 40 and an internal groove 41. This would be the same purpose as above outlined, by the metal of the ring proper flowing into the grooves of the inserted ring during the pressing operation.

At Figure 19 the inner flange is made relatively short, as shown at 42, providing a step or shoulder upon which is seated the ring 43. Several of the types of rings shown are intended to at times, as circumstances may make desirable, have the auxiliary rings fused into the folded ring, and Figure 19 is shown as an example of this structure, wherein 44 indicates a flux from the fusing, which has flowed downwardly between the flanges, and whereby the entire structure is welded into an integer with, of course, that part represented by the ring 43 of different metal than the folded ring.

At the present time it is the practice in the making of such rings for use as valve seats for internal combustion engines, to provide the seat itself of very hard material. At the present time the material used for this purpose is known as stellite. The invention, however, is not limited to any material under any particular trade-name, nor is the invention limited to an auxiliary ring of harder material than the folded ring, as it is of such nature as to adapt itself to a great variety of uses and should it be found desirable to use an auxiliary ring of a wholly different metal or alloy, or of a softer metal, such use is within the scope of the present invention.

In all of the types shown in the various figures, the great pressure exerted by the die press substantially flows the parts into unity, but with, of course, a cleavage which can be found even after machining, although practically invisible. In any case, the ring so constructed can be made much more cheaply and rapidly than the rings now produced, cut from a shaft, drilled and machined, and by reason of the construction, especially the insertion of the ring having the greater coefficient of expansion, will maintain itself seated by shrinking more firmly than rings constructed of solid material. Notwithstanding the apparent solidity of the ring, there is a certain amount of yielding in the unfused ring which is not present in the solid structure, while the fused type forms a structure in all respects the equal of the present ring made from the solid rod.

Of course, the ring illustrated may be modified and changed in various ways without departing from the invention herein set forth and hereinafter claimed.

I claim:—

1. The method of making a ring consisting in stamping an annulus from a sheet of metal and die stamping the annulus in successive steps to first upset and contract the perimeter, and then upsetting and expanding the inner part of the annulus into intimate engagement with the perimeter and machining to required form.

2. The method of making a ring consisting in stamping an annulus from a sheet of material, subjecting the annulus to successive and progressive die stamping steps whereby the perimeter is first upset and contracted to substantial cylindricity and the interior upset and expanded to substantial cylindricity and intimate engagement with the outer upset part.

3. The method of making a ring consisting in producing an annulus of sheet material and subjecting to successive die stamping steps whereby the exterior is firstly contracted to a substantially cylindrical flange, and the inner is subsequently expanded to a substantially cylindrical flange within the first mentioned flange.

4. The method of making a ring consisting in stamping an annulus from a sheet of material, subjecting the annulus to successive die stamping steps, some of which steps upset and contract the perimeter of the annulus into a substantially cylindrical flange, then expanding the interior into an upset flange at the same time forming an interval between the flanges, inserting an additional ring between the two flanges and subjecting to further die stamping steps to flow the metal of the flanges into engagement with the inserted ring.

5. The method of making a ring consisting in producing an annulus of sheet material, subjecting the annulus to successive die stamping steps to upset and contract the perimeter to a substantially cylindrical flange, expanding the interior to an upstanding flange adjacent to the first mentioned flange, inserting a ring between the flanges, said inserted ring having recesses formed therein, and subjecting to further die stamping steps flowing the material of the flanges into the recesses of the inserted ring.

6. The method of making a ring consisting in stamping an annulus from a sheet of material, subjecting the annulus to pressure in successive steps whereby the exterior is contracted to a substantially cylindrical flange and the inner expanded to a substantially cylindrical inner flange within the first mentioned flange but stopping short of the edge of said outer flange, providing thereby a step upon the top of said inner flange below the top of the outer flange and adding upon said step a material of high heat and corrosion-resisting properties to the height of the outer flange, and fusing said materials to a unitary structure.

PATRICK J. FITZGERALD.